Figure 1:
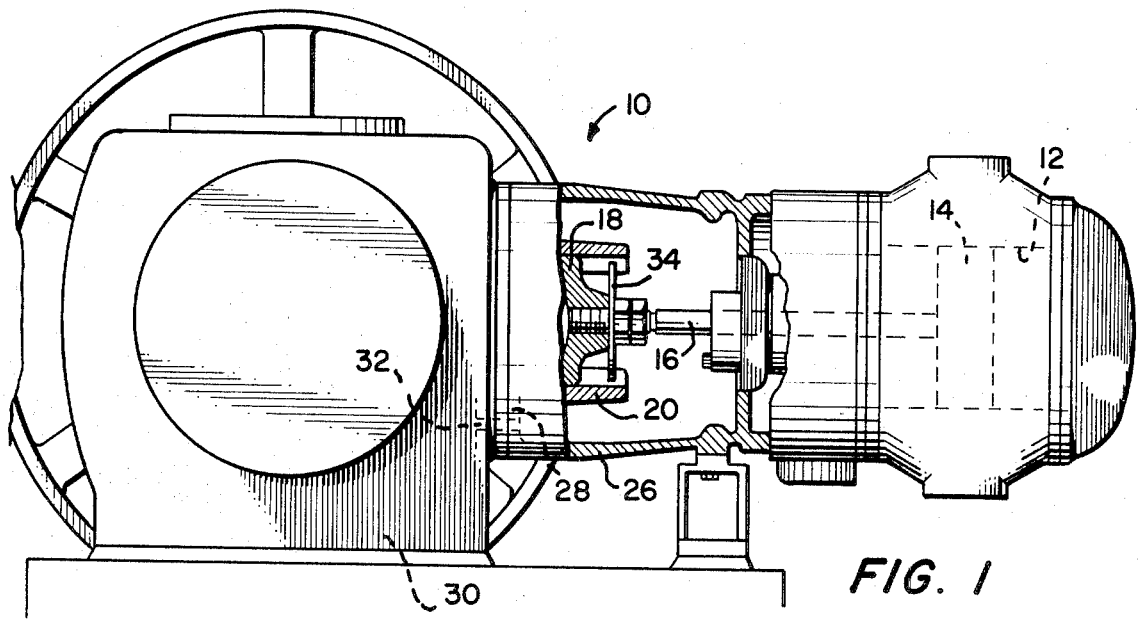

United States Patent

[11] 3,593,822

| [72] | Inventor | Gordon L. Wilcox<br>Chateauguay, Quebec, Canada |
|---|---|---|
| [21] | Appl. No. | 807,663 |
| [22] | Filed | Mar. 17, 1969 |
| [45] | Patented | July 20, 1971 |
| [73] | Assignee | Ingersoll-Rand Company<br>New York, N.Y. |

[54] A LUBRICANT BAFFLE ASSEMBLY FOR RECIPROCATING MEANS
4 Claims, 2 Drawing Figs.

[52] U.S. Cl. .................................................. 184/6 J,
                                                                    184/13
[51] Int. Cl. .................................................. F16n 31/02
[50] Field of Search ...................................... 184/6 J, 13;
                                                                    230/206

[56] References Cited
UNITED STATES PATENTS

| 970,487 | 9/1910 | Gardner | 230/206 |
|---|---|---|---|
| 992,163 | 5/1911 | Chappell et al. | 184/13 |
| 1,320,942 | 11/1919 | Tefft | 230/206 X |
| 1,522,281 | 1/1925 | Weinman | 184/(6 UX) |
| 1,881,951 | 10/1932 | Rayfield | 184/13 |
| 2,117,601 | 5/1938 | Browne | 184/(6 UX) |
| 2,204,374 | 6/1940 | Metzgar | 230/206 |

*Primary Examiner*—Manuel A. Antonakas
*Attorneys*—Carl R. Horten, David W. Tibbott and Bernard J. Murphy ABSTRACT: A reciprocating piston rod, drivingly coupled to a lubricated crosshead, the rod having a disclike baffle plate mounted thereon. Lubricant thrown by the crosshead impinges against the baffle plate, and drains therefrom into an adjacent crankcase. The baffle plate is provisioned to interrupt the throw or pitch of the lubricant by the crosshead, both to avoid a lubricant loading or saturation of the piston rod stuffing box, and, consequently, to inhibit introduction of lubricant from the stuffing box into the chamber.

INVENTOR
GORDON L. WILCOX
BY
*Bernard J. Murphy*
AGENT

A LUBRICANT BAFFLE ASSEMBLY FOR RECIPROCATING MEANS

This invention pertains to baffle assemblies and in particular to a baffle assembly which is effective for interdicting an unwanted "throw" or pitch of lubricant which proceeds from inertial effects of a reciprocating lubricated component.

In the prior art a reciprocating and lubricated component necessarily throws lubricant therefrom to areas adjacent thereto, and frequently with undesirable consequences. For instance, a rapidly reciprocating piston rod which is drivingly coupled to a lubricated crosshead, as would be the case in a gas compressor, causes the crosshead to pitch lubricant into the stuffing box provided for the piston rod.

Oil wiper rings are commonly provided about the piston rod, in the prior art, to forestall a migration of oil along the rod and into the stuffing box. However, if lubricant bypasses the oil wiper rings, it will inevitably get into the piston-cylinder because the stuffing box, which is disposed before the cylinder, is effective only for prohibiting the passage of fluid out of the cylinder; it is ineffective for prohibiting the introduction of lubricant into the cylinder. Therefore, it has been found that oil wiper rings are ineffective to interdict the throw of oil into the stuffing box by the crosshead.

In tests it has been shown that as much as 6 ounces to 1 quart of lubricant will pass from the crankcase into the piston cylinder, over a period of 24 hours of operation (of an air compressor), where only oil wiper rings are provisioned to inhibit the introduction of oil to the stuffing box. The difficulty arises from the fact that the crosshead has a dimension, across the plane of lubricant throw, which is greater than the outside diameter of the oil compressor rings. Therefore, upon reciprocation, fine droplets of oil, with each stroke of the piston rod and crosshead, remove from the crosshead and are thrown into the stuffing box, completely bypassing the oil wiper rings.

It is an object of this invention, therefore, to teach means for obstructing the transfer of lubricant from a reciprocating and lubricated component. It is another object of this invention to provide means for redirecting lubricant, thrown by a reciprocating member, to a lubricant reservoir of its origin.

A feature of this invention comprises the use of a disclike baffle plate which is mounted on the piston rod in immediate adjacency to the crosshead, being provisioned to cause any lubricant thrown by the crosshead to impinge thereupon and drain therefrom into an adjacent crankcase.

Figure 2:
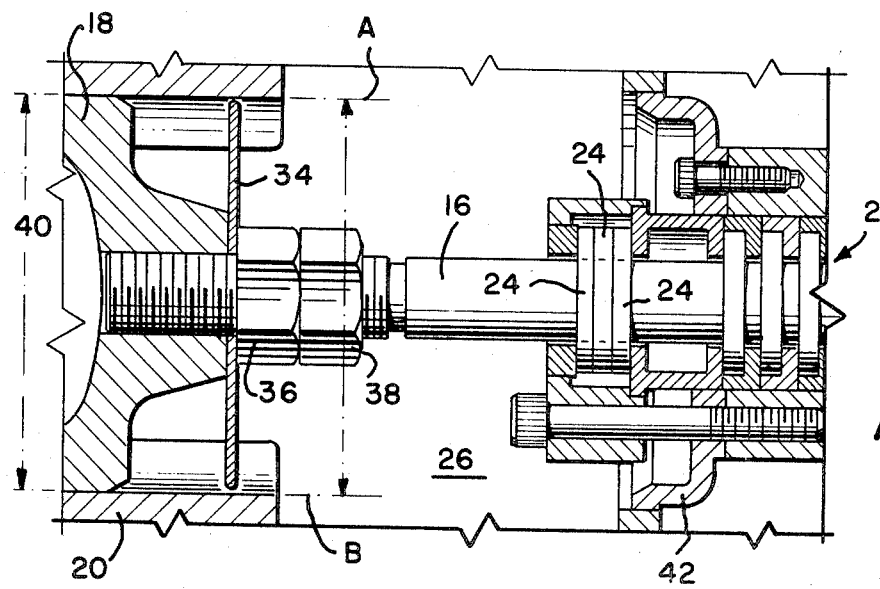

Further objects and features of this invention will become more apparent by reference to the following discussion taken in conjunction with the accompanying figures in which:

FIG. 1 is a side elevation of a gas compressor, showing the distance piece, crosshead, and crosshead guide, together with the novel baffle plate, in cross section; and FIG. 2 is an enlarged view of the cross section of FIG. 1, further showing the oil wiper rings and stuffing box assemblies partly in cross section.

As shown in FIG. 1, a gas compressor 10 comprises a compression chamber 12 in which is disposed a reciprocating piston 14. The piston 14 is connected to a translating piston rod 16 the other end of which is coupled to a lubricated crosshead 18. The crosshead 18 is disposed for reciprocation in a guide 20 secured to the frame or housing of the gas compressor. The piston rod 16 is sealingly disposed in a stuffing box 22, shown best in FIG. 2, and carries oil wiper rings 24 thereabout for inhibiting the migration of lubricant therealong.

The piston rod 16 and crosshead 18 are arranged for reciprocation within a distance piece 26. The distance piece 26 is separated by partitioning 28 from an adjacent crankcase 30 in which a supply of lubricant is maintained. As can be noted, the gas compressor 10 is horizontally disposed, and porting 32 is formed in the partitioning to provide for the drainage of lubricant from within the distance piece 26 to the crankcase 30. A crankshaft (not shown) mounts thereto a connecting rod (not shown) which rod is in turn connected to the crosshead 18.

In operation, the crosshead 18 reciprocates within guide 20 and, with each stroke, throws oil both into the distance piece area and into the crankcase area. The oil thrown into the crankcase is of no consequence. However, the oil thrown into distance piece 22 must be obstructed or else it will overload the stuffing box 22 and pass therethrough to the compression chamber 12. Accordingly, it is a teaching of my invention to provision a baffle plate 34 about piston rod 16 to obstruct the throw of lubricant from the crosshead 18 toward the compression chamber 12.

The baffle plate 34 comprises a circular, disclike member having an aperture through the center accommodating its mounting on the piston rod 16. As noted in FIG. 2, the baffle plate 34 is disposed in immediate adjacency to the "piston end" of the crosshead 18 and is secured thereto by a lock nut 36 and a check nut 38. Now, with reciprocation of the crosshead 18, lubricant thrown by the crosshead will impinge against the baffle plate 34 and drain therefrom to the area enclosed by the distance piece 26. Further, the porting 32 provides for the drainage of this obstructed lubricant back into crankcase 30.

With reference to FIG. 2 it can be seen that the crosshead 18 has a vertical dimension 40 which is greater than the diameters of wiper rings 24. In the absence of baffle plate 34, then, lubricant is pitched from the extremities of dimension 40 into the annular, cup-shaped, stuffing box retainer 42. Such pitched lubricant wholly bypasses the wiper rings 24, and insinuates itself into the stuffing box 22, proceeding therefrom into chamber 12.

Baffle plate 34 has a vertical dimension, extending between reference lines A and B, which is substantially equal to that of dimension 40 —save for minute clearances at the extremities thereof to accommodate for its nonwiping movement within guide 20. Thus, lubricant pitched by the extremities of dimension 40 impinges against plate 34, collects thereon, and is redirected downward, i.e., drains downward, for return to reservoir or crankcase 30 (via porting 32).

Controlled testing has substantiated that the use of my novel baffle plate 34 is remarkably effective. A gas compressor that had been "passing" 6 to 7 ounces of lubricant in a 24-hour operating period "passed" but 1 ½ounce in the same period. Another gas compressor, using my invention, had its lubricant consumption reduced from 1 quart in 24 hours to less than 1 quart in 3 weeks of heavy use.

The figures illustrate only one embodiment of my invention of which other embodiments are readily feasible. For instance, it is entirely feasible and practical to provide an annular, inwardly projecting, disclike member at the "piston end" of the guide 20, instead of mounting such a baffle on the piston rod 16, to obstruct the transfer of lubricant from the distance piece 18.

And, of course, it is wholly practicable to fix a baffle plate, similar to that of plate 34, at the "piston end" of the crosshead 18. My teaching is not limited to mounting plate 34 about rod 16.

Therefore, while I have described my invention in connection with a specific embodiment thereof it is to be clearly understood that this is done only by way of example and not as a limitation to the scope of my invention as set forth in the objects thereof and in the appended claims.

I claim:

1. A baffle assembly, comprising:
    means having, and disposed for reciprocation along, a given longitudinal axis;
    means fixed against movement, and disposed for guiding other movable means relative thereto;
    block means engaged with, and reciprocably movable relative to, said guiding means, lubricated to facilitate such movement; and
    single means cooperative with said guiding means for obstructing a reciprocation induced and given direction pitching of lubricant from said block means;
    said reciprocation and block means both having means effecting a mutual intercoupling therebetween to cause movement of one of said both means to effect a movement of the other thereof; wherein said obstructing means is fixed to one of said reciprocation, guiding and block means; piston said block means comprises a crosshead, slidably disposed in said guiding means for drive coupling with other components;

said reciprocation means comprises a piston rod; the longitudinal axis of said piston rod is horizontally disposed;

said crosshead has a given vertical dimension; said obstructing means comprises a circular baffle plate secured about said rod and adjacent to one end of said crosshead;

said plate having an outside diameter substantially equal to said vertical dimension;

said crosshead is disposed within an enclosure which is adjacent to a lubricant reservoir; and said obstructing means include means cooperative with said enclosure for conducting obstructed lubricant to said reservoir.

2. A baffle assembly, according to claim 1, wherein:

said obstructing means comprises wall means, interposed in a spacial area which subsists between said crosshead and one axial end of said piston rod which is furtherest from said crosshead, to baffle any inertially caused pitching of lubricant through said area.

3. A baffle assembly, according to claim 1, wherein:

said obstructing means comprises barrier means, carried on said reciprocation means, having a surface extending radially from said reciprocation means to thwart movement of lubricant therebeyond.

4. A baffle assembly, according to claim 2, wherein:

said wall means comprises a wall-like circular baffle plate.